J. LEE.
Seed-Planter.
No. 18,821.
Patented Dec. 8. 1857.
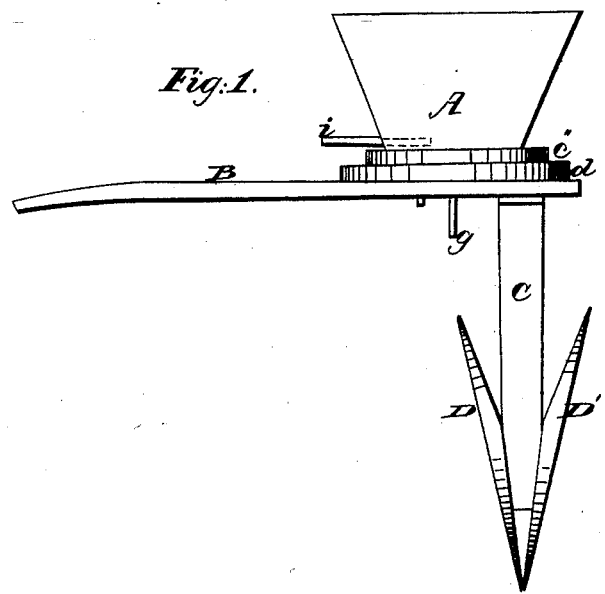
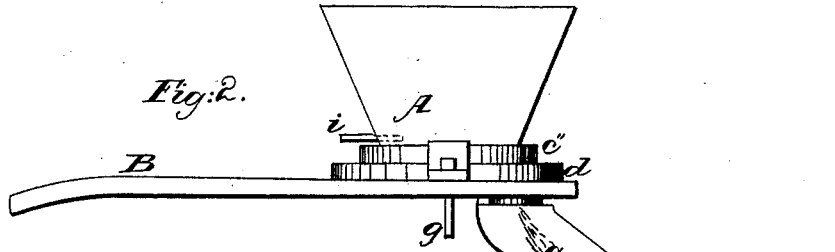
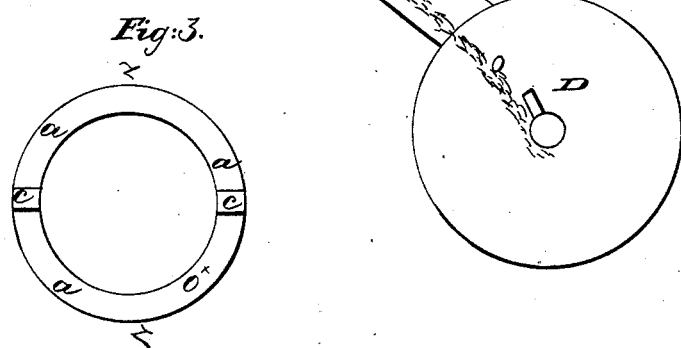

UNITED STATES PATENT OFFICE.

JOEL LEE, OF GALESBURG, ILLINOIS.

IMPROVEMENT IN SEED-PLANTERS.

Specification forming part of Letters Patent No. 18,821, dated December 8, 1857.

*To all whom it may concern:*

Be it known that I, JOEL LEE, of Galesburg, in the county of Knox and State of Illinois, have invented certain new and useful Improvements in Seed-Planters; and I do hereby declare that the following is a full, clear, and exact description of the same, reference being had to the accompanying drawings, and to the letters of reference marked thereon.

The nature of my invention consists in the swivel seed-tube and the bevel-wheels, arranged as will be hereinafter described.

In order that those skilled in the arts may manufacture and use my invention, I will proceed to describe its construction and operation.

In the accompanying drawings, which make a part of this specification, Figure 1 shows a back view of the swivel-tube and bevel-wheels. Fig. 2 shows a side view of the tube and wheels when swiveled around. Fig. 3 is a view of the interior of the seed-distributing chamber.

In Figs. 1 and 2, A represents the seed-hopper.

$c''$ is the bottom of the seed-hopper.

$d$ is the distributing-chamber.

$g$ is a small shaft which connects with the wheel N, to which are attached the scrapers $c$ $c$ within the distributing-chamber.

B is the platform on which the hopper and distributing apparatus rest and by means of which they are connected to a plow or any other implement.

C is the swivel-spout, said spout being secured to the bottom of the seed-distributer, at one end, in such a manner as to allow it to swivel around in any direction which may be desirable.

D D' are two bevel-wheels, secured to the other end of the swivel-spout, said wheels being beveled on the inside and secured to the spout in such a manner that their edges will meet in front of the swivel-spout at that point where it is desirable for them to cut and part the earth when the machine to which they are ttached is in motion and operation.

O shows the chamber in the seed-spout through which the seed passes from the hopper to the ground. The seed falling down through this spout is dropped between the wheels, the wheels part the earth, and as they pass on the earth falls in on the seed and covers it in lightly.

Fig. 3 shows the bottom of the seed-distributing chamber. This chamber has two rims or flanges, between which the seed falls from the hopper, N being a wheel to which are attached the scrapers $c$ $c$, which serve to scrape the seed which falls in between these two flanges or rims into aperture marked $x$. Thence it falls into the spout C, and thence to the ground.

$i$ in Figs. 1 and 2 is a slide for regulating the amount of seed to be discharged. This swiveling and adjustable tube is very convenient when the vehicle to which it is attached makes a change in its course, as it will change immediately to correspond with the change of the vehicle, and at the same time deposit the seed accurately.

I may use any of the well-known ways of giving motion to the shaft $g$, and thus setting the wheel and scrapers in motion for distributing the seed.

Having thus fully described my invention, what I claim as new, and desire to secure by Letters Patent, is—

The bevel-wheels D D, constructed, arranged, and operated in the manner herein set forth, when combined with the swivel-tube C, for the purpose described.

JOEL LEE.

Witnesses:
C. M. ALEXANDER,
CHARLES ALEXANDER.